Nov. 23, 1937. N. W. WEBB 2,100,294
METHOD AND MACHINE FOR PRODUCING BRAZED SEAMS IN WIRE CLOTH
Original Filed June 13, 1935 2 Sheets-Sheet 2
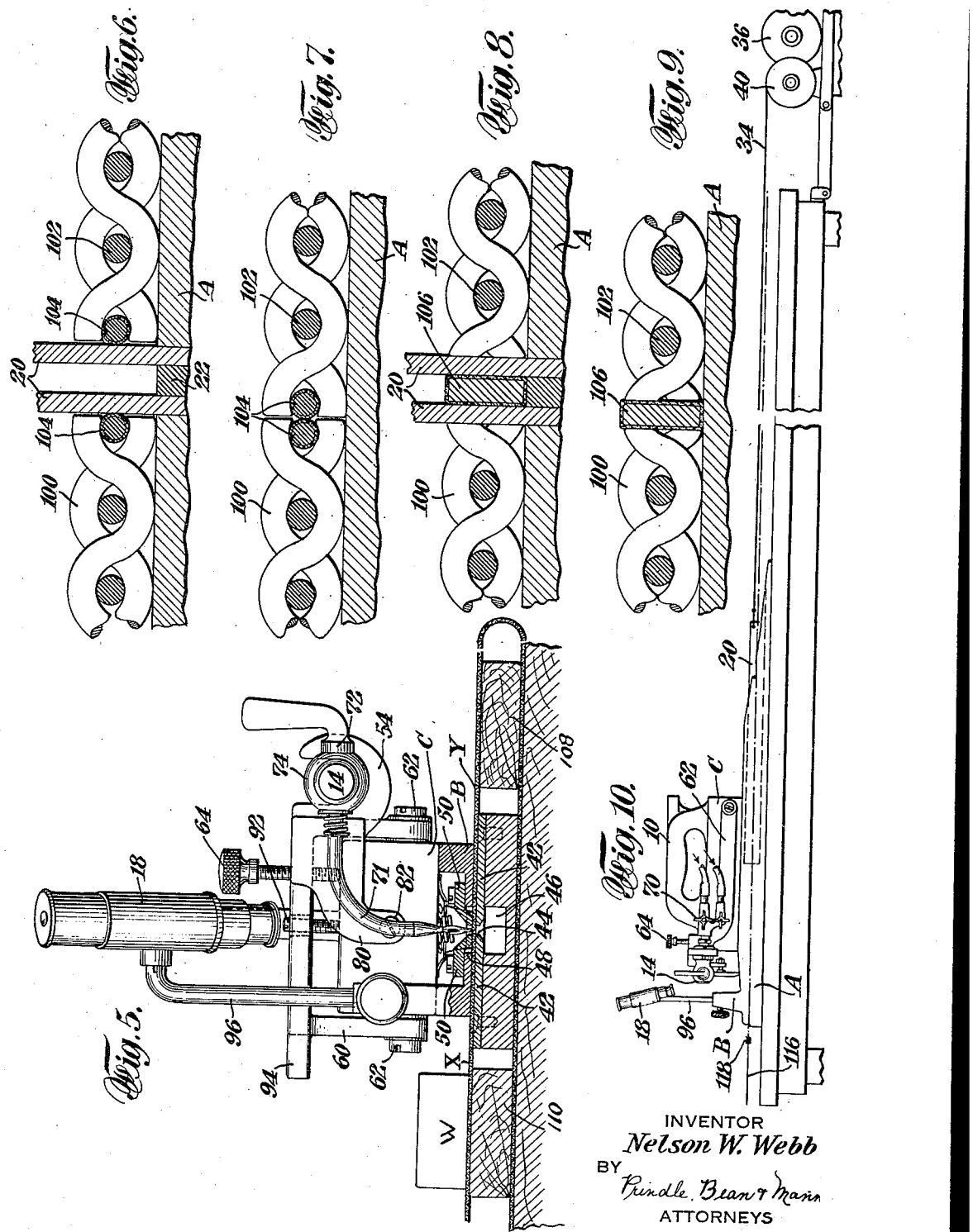

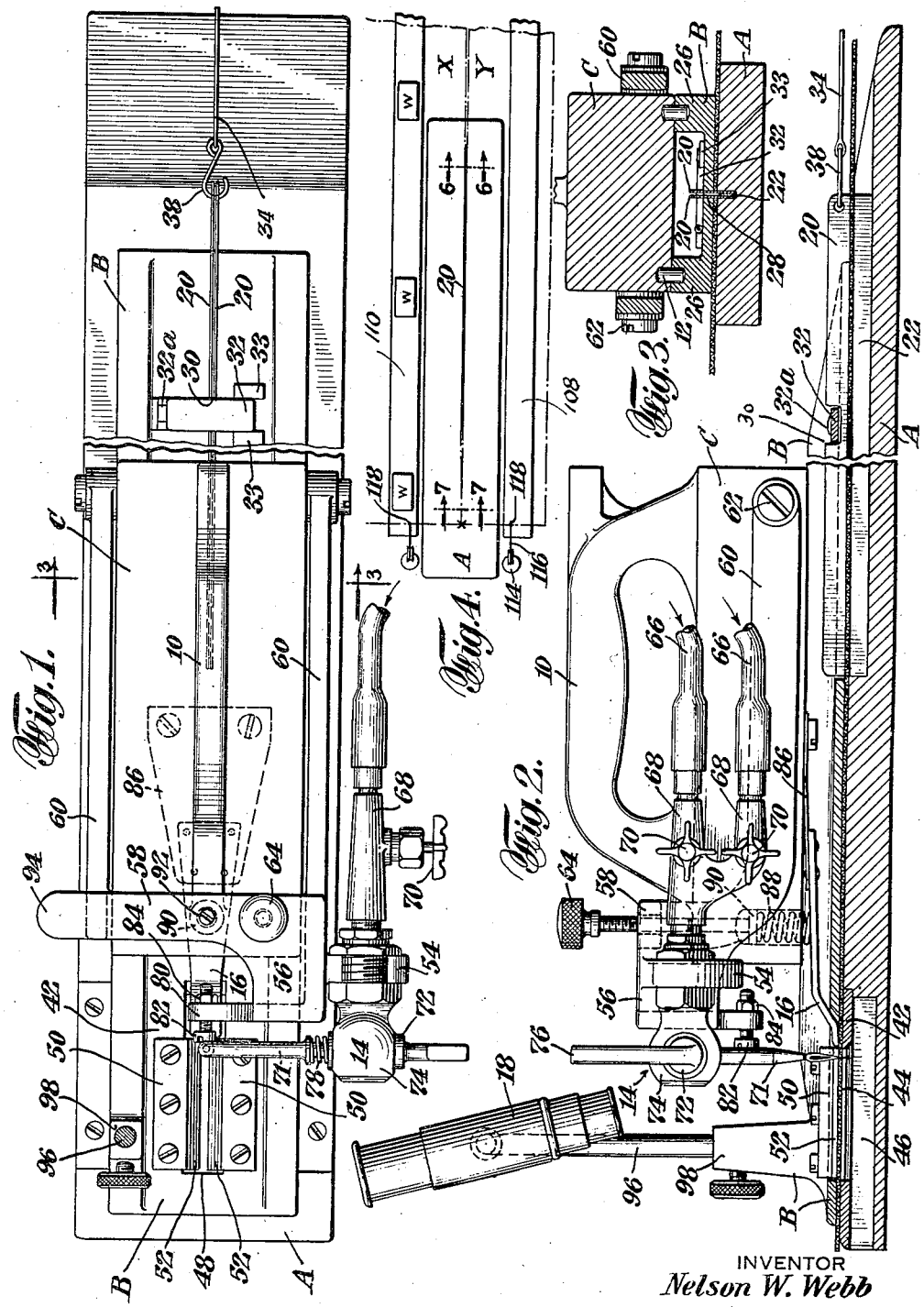

Patented Nov. 23, 1937

2,100,294

UNITED STATES PATENT OFFICE 2,100,2

METHOD AND MACHINE FOR PRODUCING BRAZED SEAMS IN WIRE CLOTH

Nelson W. Webb, Belleville, N. J., assignor to Eastwood-Neally Corporation, Belleville, N. J., a corporation of New Jersey Application June 13, 1935, Serial No. 26,446
Renewed May 5, 1937

28 Claims. (Cl. 113—59)

The invention relates to method and apparatus for producing brazed seams in wire cloth for paper machines and other uses. The method and the machine used in connection therewith effect the brazing together of the edges of the wire cloth-ends with or without an interposed solder-covered strand or ribbon and accomplish the brazing regardless of the waviness normally present in the edges of woven wire cloth-ends and regardless of inaccuracies in the positioning of the cloth-ends on the table or other support on which the brazing operation is performed. In other words, the method is such that it readily compensates for such irregularities and inaccuracies and the same applies to the machine, which is a light, portable machine freely slidable in any direction on the table and therefore freely able to follow and braze together the edges of the cloth-ends regardless of curves or waves in said edges and the like.

With these and other inherent objects and advantages in view, my invention consists in the method and in the construction, arrangement and combination of parts hereinafter described and claimed, reference being had to the accompanying drawings which show for the purpose of illustrative disclosure a preferred method of practising the invention and a preferred embodiment of the machine, it being understood however, that various changes may be made in practice therein within the scope of the claims without digressing from my inventive idea.

In the drawings:

Fig. 1 is a broken plan view of the aforesaid machine;

Fig. 2 is a broken side elevation partly in vertical section of the machine of Fig. 1 shown operatively related to the wire cloth;

Fig. 3 is a transverse section on line 3—3 of Fig. 1 looking in the direction of the arrows;

Fig. 4 is a diagrammatic plan view on a still more reduced scale to supplement the description in the specification of a preferred method of practising the invention;

Fig. 5 is a view of the left hand end of the machine showing it in use in connection with appurtenances described in the specification;

Fig. 6 is an enlarged fragmentary cross sectional view on the line 6—6 in Fig. 4, looking in the direction of the arrows, of the machine parts and the wire cloth-ends;

Fig. 7 is the same except the section is taken at 7—7 in Fig. 4;

Fig. 8 is a cross section taken at 6—6 in Fig. 4 and is similar to Fig. 6 except that it shows the use of the machine in connection with a soldered coated ribbon for uniting the cloth ends;

Fig. 9 is a cross section taken at 7—7 in Fig. 4 and is similar to Fig. 7 but pertains to the use shown in Fig. 8; and Fig. 10 is a broken side elevation of a table suitable for supporting the machine and shows the machine thereon and the engine for pulling it along the table and indicates by the broken line the wire cloth being operated on by the machine.

Referring to the drawings the machine there shown is a portable brazing machine operable on any suitably long table or bench for brazing together the edges of wire-cloth to make endless Fourdrinier belts and the like. The machine carries a brazing torch and a low power microscope and other attachments and is pulled along the table following the edges of the cloth-ends resting on the table while they are maintained in abutted relation by the operator between the operative parts of the machine and under the torch carried by the machine.

The machine is used on any suitable table along which it is drawn or otherwise given a motion of translation. The wire cloth is also laid on the table with its edges to be joined directed toward and adjacent each other. There is an unavoidable curvature in the end-edges of woven wire cloth for making Fourdrinier belts which however is accommodated for by this freely movable machine because the operator following the machine as it is pulled along the table can readily push together and bring into abutting relation the particular portions of said edges which successively underlie the torch while it travels with the machine along the table.

The machine is preferably made of a light weight metal or metal alloy such as aluminum except for certain attachments or inserts which are advantageously made of some other metal. For example certain parts directly subject to the heat of the torch are preferably made of nichrome alloy. The machine comprises a base part A resting on the table and by which it is pulled along the table and under the abutted ends of the wire cloth laid on top of said base part.

A part B of the machine rests on the base part A with the cloth-ends X and Y sandwiched therebetween.

The part C of the machine, preferably formed with a handle or grip 10 like the handle of a laundry-iron rests on the part B with a separable pin and socket connection 12 therewith so as to carry along with A and B but also so as to be readily removable from B and as readily replaceable.

This part C carries the torch 14, and a presser foot 16 etc. as will be later described. The part B carries the microscope 18.

The base A of the machine has a sufficiently extensive bottom or sufficiently widely disposed bottom portions or parts suitable for supporting the machine upright for free movement in any direction on a table.

Describing now the machine in greater detail. The base part A carries two thin metal strips or fins 20 which it will be seen later function as a straight edge or guide for the edges of the cloth-ends. These strips are spaced apart and parallel and rest on their long edges in a longitudinal medial groove in the top of the base part at its right-hand end and are shown in plan view in Fig. 1, in side elevation in Fig. 2 and in transverse section in Figs. 3, 6, etc. They are rigidly secured to the part A by any convenient means, as by being frictionally tightly wedged between the walls of the groove in the part A by means of a strip 22 which is driven down into the position shown in Fig. 3 between the strips.

The part B is trough-shaped in fore and aft section as shown in Figs. 3 and 5, the trough comprising a bottom 24 and upstanding sides 26. The bottom is formed with a longitudinal slot 28. The strips 20 are vertically high enough to project up freely through this slot as shown in Figs. 2 and 3 and are formed with a notch 30 in their upper edge, Fig. 2. A cross piece 32, Figs. 1, 2 and 3 attached to the bottom of B is adapted to bridge across the slot therein and to rest down in the notch 30 in the strips when the part B has been assembled on A as shown in Figs. 2 and 3 with the wire cloth ends sandwiched therebetween.

The wire or cord 34, from the traction engine 36 is connected by a hook 38, with eyes in the end of the guide-strips 20, as shown in Figs. 1, 2 and 10. From the foregoing it will be seen that the engine 36 as it winds up the cord about the drum 40 pulls the guide 20 and the base part A to which it is secured along the table. The parts B and C and the supported parts of the device move along with base part A due to the engagement of the cross piece 32 of the part B in the notch 30. Preferably this cross piece is releasably supported relatively to the notch, as by hinging it at 32a to the part B. Its free end is or may be located between blocks or projections 33 on the bottom of the part B when the cross piece is in the notch. In this way the cross piece becomes in effect a releasable latch for use in the emergency hereinafter referred to.

The left-hand end of the base part A, as best shown in Figs. 1, 2 and 5, has a slotted nichrome heat resistant plate 42 recessed therein flush with its top surface and secured in that position by screws as shown. This plate, having a slot 44 running lengthwise of the machine, is located over a rather deep, wide and long recess 46 in the part A. The torch operates in line with this slot and over this recess; and waste products due to oxidation and other causes collect in the recess 46, which is open ended to enable it to be cleaned out when necessary.

The left-hand end of the part B is formed with a rectangular opening 48, Figs. 1 and 5, corresponding to the recess 46 in the part A. Nichrome members 50, Figs. 1 and 5, are secured to the part B at the long sides of the aforesaid rectangular opening and have downwardly inclined lip portions 52 which extend into bearing contact at their free inner edges or ends with the upper face of the cloth-ends to be brazed together. The free edges of these lip portions define a slot extending lengthwise of the machine, substantially registering or in line with the slot 44 in the nichrome plate 42; and the flame of the torch points down through these slots as indicated in Figs. 2 and 5.

The torch 14 is or may be of the oxyacetylene type and is supported by a lug 54 on the side of a yoke 56 consisting of a cross bar 58 and integral arms 60 the latter located at opposite sides of the part C pivoted by their free ends on trunnion screws 62 or the like, so that the yoke and the torch which it carries can be swung and adjusted up and down to adjust the point of the flame to the work or to remove it altogether therefrom. For this purpose a knurl-headed screw 64 works in a screw-threaded hole in the cross bar of the yoke and bears against the top of the part C so that twisting said screw serves to adjust the torch vertically. Tubes 66 connect oxygen and acetylene tanks (not shown) with nipples 68, Fig. 2, leading to the torch, these being controlled separately by hand valves 70.

The nozzle 71 of the torch is a curved or angular tube which is a continuation of a hollow valve-plug 72 rotatable in its valve casing 74. A handle 76 on the other end of the plug enables the plug to be rotated to swing the nozzle away from the work or to adjust the angle of the flame to the work. The valve is substantially the ordinary plug valve and the plug inside the casing 74 may be slightly tapered as is usual in such valves, and a spring 78 may be provided to keep the plug seated and leak-tight. It will be understood that the plug is hollow and that there is a port through its wall leading to an annular groove whereby the nozzle 71, regardless of the position into which it may be rotated by the handle 76, is always in communication with the bore in the valve casing through which the gases pass as delivered by the valve controlled nipples 68.

A lug 80, Figs. 1 and 2, forming part of the yoke carries a screw 82, whose head is in line with the side of the nozzle 71 to form an adjustable abutment limiting the swing of the nozzle in one direction. A lock nut 84 maintains any desired adjustment of the screw. The described abutment screw 82 having been adjusted into contact with the nozzle when the latter is in its proper operating position relatively to the work, the same position for the nozzle is always subsequently obtainable by merely swinging it into contact with the head of the screw.

The presser foot 16 made of nichrome alloy is attached by a flexible member 86 to the underside of the part C and extends longitudinally in the trough of the part B; and its foot portion extends downwardly through the right hand end of the opening 48 in the bottom of the part B and bears down upon and straddles the abutted ends of the cloth as indicated in Figs. 1 and 2. The pressure of this foot is made yielding and adjustable by means consisting of a coil spring 88 resting on the presser foot and contained in a vertical socket in the part C. A piston 90 bears on the upper end of this spring adjustable vertically by a screw 92 which is tapped into a vertical hole in part C, the exposed upper end of said screw being screw-driver slotted whereby the degree of compression of the coil spring can be adjusted by turning the screw to give the desired pressure on the abutted wire cloth ends. It will be noted that the presser-foot straddles the two edge portions of the cloth immediately to the right of the point of application of the torch flame.

94 in Fig. 1 designates a finger piece on the yoke enabling it to be swung upwardly to carry the torch away from the work or for any other purpose. 18 is a sight-glass or microscope to enable the operator of the machine to view the work at the point of the flame and ascertain whether the brazing of the edges of the cloth is proceeding satisfactorily. This microscope is swiveled as shown to a horizontal arm on the upper end of a rod 96 which is vertically adjustable in a socket member 98 adjustably upheld therein by a set-screw, the socket member being carried by the part B.

The edges of the wire cloth may be brazed together, as well known in the art, with various forms of seams. The herein machine is usable to effect any of said forms of seam. Without attempting to illustrated all of them, Figs. 7 and 9 show two of the more important forms of seam on a greatly exaggerated scale, the warp or longitudinal wires of the cloth being designated 100 and the weft or transverse wires 102. The edges of the cloth in Fig. 7 have been trimmed so that each longitudinal wire ends in an open-ended half loop. Also the terminal weft or transverse wires have been removed and replaced by solder coated wires 104. The torch is then run along the abutted edges, Fig. 7, of the cloth, melting the solder, such as silver solder, causing it to flow between the abutting ends of the warps to unite said ends and also to unite the wires 104 to the warps and to each other.

In Fig. 9 the properly trimmed ends of the warps 100 abut against the sides of the silver solder coated metal ribbon 106 located between them. The torch traveling along the ribbon melts the solder and solders the ends of the warps to the sides of the ribbon.

The preferred method involving the use of the machine may be described as follows:—

In the first place, one end Y of the wire cloth, Figs. 4 and 5, is pulled from the back of a suitable table towards and beyond the front of the table. Wooden beams 108 and 110 are then laid down on top of this cloth-end Y as in Fig. 5 at the front and back of the table. The machine part A is then placed between these beams on the cloth on the table, extending lengthwise thereof. The wooden beams 108 and 110 have preferably substantially the same height as the machine part A. The extremity of the cloth-end Y is then bent up and laid down as in Fig. 5 so as to cover the top of the front beam and the front half of the top of the machine part A with the edge of the cloth against the front face of the guide 20 and traversing the slot 44 in the nichrome plate 42 on the part A.

It will be understood that the machine part A is located at the start of the brazing operation at the left-hand end of the table. The other end X of the cloth is now brought forward from the back of the table and laid down on the rear beam and on the rear half of the top of the machine part A against the rear face of the guide 20 and over the slot 44 in the nichrome plate. Weights W are then laid on the cloth-end X where it rests on the rear beam, see Fig. 4.

The machine part B is then superposed on the part A with its cross cleat or latch 32 in the notch 30 in the guide 20. The part C carrying the torch is then superposed on B with the pins 12 seated in their sockets. The cord or wire 34 of the traction engine 36, Figs. 1 and 10, is then attached to the end of the guide 20.

Preferably weights 114 suspended on cords 116 are attached by clips 118, to the side margins of the cloth ends X and Y where they overlie the beams, see Figs. 4 and 10. These weights overhang the ends of the table and apply a tension to the cloth ends tending to hold their edges more or less taut and flat.

The gas connections are made and the torch 14 lighted and adjusted and all other adjustments are made. The operator positions himself in front of the table at the front of the machine and follows it as the traction engine pulls it to the right along the table. The operator lays his hands on the front end Y of the cloth and keeps pressing its edge against the guide 20 and the latter against the edge of the rear cloth-end X and at the same time presses the edge of Y against X under the presser foot 16, and at the torch 14, while the torch follows along with the machine brazing and seaming together the two edges of the cloth.

The operator watches the brazing through the microscope. Upon detecting any imperfection therein, he swings the torch out of action, and stops the traction engine. He then uses the handle 10 on the part C to slide the machine parts C and B to the left on the part A which remains stationary, this being permitted by temporarily disengaging the cross-piece 32 from the notch 30 in the guide 20. He then swings the torch back into operating position while by hand he moves the machine parts C and B and the torch 14 to the right thereby effecting a re-brazing of the defective seam.

The operator quickly learns the technique of operating the machine and readily produces perfect seams.

Before starting the seam, obviously the left hand corners of the two ends of the cloth must be brought together and the brazing started there, either by the machine or by a preliminary brazing by hand.

To make the seam of Fig. 9, the solder coated ribbon 106 is placed in position resting on edge in the groove between the guide strips 20 as shown in Fig. 8. This ribbon 106 extends lengthwise from one end of the table to the other. Its left end is brazed by hand between the opposed left hand corners of the cloth-ends. A lengthwise tension is applied to the ribbon from the ends of the table to keep it taut in any suitable manner. The strips 20 guide the ribbon and keep it on edge between the adjacent edges of the cloth-ends while the machine is being pulled along to braze the seam.

It will be understood that the distance between the guide strips 20 is very small in practice, namely only sufficient to slidably receive the thickness of the solder coated ribbon 106. Two guide strips 20 are shown in the illustrated machine but are not necessary to make the seam shown in Fig. 7. One guide strip would suffice. However, the two-guide strip form of the machine answers perfectly well to make the seam of Fig. 7. They are so thin and so close together that they are in effect a single guide so far as permitting the operator to keep the edges of the cloth pushed together under the presser foot and at the torch. It will be understod that there is enough distance to permit this to be accomplished between the left hand end of the guide strips and the torch. The presser foot 16 keeps the two edge portions of the cloth in the same horizontal plane; and the constant gentle pushing of the front edge portion toward the rear edge portion keeps the edges in contact at the torch and accommodates for any waviness in the edges of the cloth and any inaccurate positioning thereof on the table.

It will be understood that "guide" herein and in the claims refers to and includes either the single or the spaced double form of the guide or their equivalents.

Further it will be understood that the herein method and apparatus are usable to produce not only fully brazed seams but what may be called semi- or partly-brazed seams. By semi-brazed seam is meant a seam wherein the end-wires 104 Figs. 6 and 7 are brazed in position at the edges of the cloth but said edges are not brazed together but are by a subsequent operation wire-sewn together as well understood in this art. Obviously the herein method and machine readily produce this semi-brazed type of seam, the procedure being the same as heretofore set forth except that the operator keeps the cloth edges out of contact under the torch instead of pressing them together into contact. When brazing the cloth edges for this type of seam, obviously guide means like 20 could be located sufficiently near the torch to prevent the cloth edges from coming into contact at the torch but which will nevertheless allow the torch to braze said edges independently.

What I claim is:

1. A portable brazing machine for brazing wire-cloth edges comprising in combination a base part, an upper part on the base part, said upper part and said base part slidably receiving between them the thickness of the wire-cloth, the base part having a bottom suitable for supporting the machine upright for free movement in any direction on a table, a cloth-edge guide extending lengthwise of the machine at the division between its base part and upper part, means for translating said base and upper parts as a unit along a supporting table and slidingly across the interposed cloth-ends whose edges project toward each other against the sides of the cloth-edge guide, and brazing means carried by the machine operative on the edges of the cloth beyond one end of the guide.

2. The brazing machine of claim 1 further characterized by the cloth-edge guide having an exposed end to which the translating means is attached.

3. The brazing machine of claim 1 further characterized by the cloth-edge guide being mounted on one machine part and having a vertical portion projecting freely into a longitudinal slot in the other part.

4. The brazing machine of claim 1 further characterized by the guide being mounted on one machine part and having a vertical portion projecting freely into a longitudinal slot in the other part, which latter part has means engageable with the guide whereby the base and upper parts of the machine are movable together.

5. The brazing machine of claim 1 further characterized by the guide being mounted on one machine part and having a vertical portion projecting freely into a longitudinal slot in the other part which latter part has means engageable with the guide, whereby the base and upper parts of the machine carry together, said means being releasable.

6. The brazing machine of claim 1 further characterized by there being a microscope carried by the upper part of the machine adjacent the operative locus of the brazing means so as to permit direct magnified observation of the progress of the brazing operation.

7. The brazing machine of claim 1 further characterized by the brazing means being a gas-torch comprising a rotary-plug valve, an angular nozzle, and a handle, the angular nozzle being a continuation of the rotary valve-plug which is hollow and has the handle at its other end whereby the torch nozzle can be rotated into and out of operative position.

8. The brazing machine of claim 1 further characterized by the brazing means being a gas-torch comprising a rotary-plug valve, an angular nozzle, and a handle, the angular nozzle being a continuation of the rotary valve-plug which is hollow and has the handle whereby the torch nozzle can be rotated into and out of operative position, there being an adjustable screw in line with the end portion of said nozzle for standardizing its operative position.

9. The brazing machine of claim 1 further characterized by there being a yoke comprising a cross bar which supports the brazing means and comprising arms which straddle the upper machine part and are pivoted by their ends to the sides of said part, and means for adjustably supporting the cross-bar end of the yoke and thereby adjusting the height of the brazing means relatively to the work.

10. A portable brazing machine for brazing wire-cloth edges comprising in combination a base part, another part on the base part, said base part and said other part slidably receiving between them the thickness of the wire cloth and said other part being trough-shaped in fore and aft section, a cloth-edge guide member on the base part extending lengthwise thereof and having a vertical portion extending freely into a slot through the bottom of the trough-shaped part, the latter having a piece extending across said slot received into a notch in the upper edge of the guide member, whereby said machine parts are separably united for movement as a unit, and means attachable to the end of the guide member for translating the machine along a supporting table.

11. The brazing machine of claim 10 further characterized by there being a part formed with a handle or grip resting on the sides of the trough-shaped part separably connected therewith, and a brazing torch carried by said part having the handle.

12. The brazing machine of claim 10 further characterized by there being a part formed with a handle or grip resting on the sides of the trough-shaped part separably connected therewith, a brazing torch carried by said part having the handle, and a presser foot secured to the underside of said handle part extending longitudinally within the trough-shaped part with its foot positioned at an opening through the bottom of the trough-shaped part for engagement with the wire cloth.

13. A portable brazing machine for brazing wire-cloth edges comprising in combination, a base part, an upper part on the base part, said upper part and said base part slidably receiving between them the thickness of the wire cloth and the base part having a bottom suitable for supporting the machine upright for free movement in any direction on the table, a cloth-edge guide extending lengthwise of the machine at the division between its base part and upper part, the base part having a recess in its end which is also open to the top of said part, and the upper part having an opening registering with the top of the recess in the base part, and heat resisting members at the recess in the base part and at the opening in the upper part formed with longitudinal registering slots in line with the cloth-edge guide for the torch flame to operate through and arranged to bear on the wire-cloth at said slots, means for translating said base part and upper part as a unit along a supporting table, and brazing means carried by the machine operative on the edges of the cloth at the aforesaid longitudinal registering slots.

14. The brazing machine of claim 1 further characterized by the upper part being loosely related in vertical direction to the base part so that the weight of the upper part bears down upon the aforesaid cloth ends interposed between it and the base part.

15. A portable machine for brazing together wire cloth ends comprising a base having a slot, a guide member fixed to said base in alinement with said slot, a head mounted on said base for slidable movement lengthwise of said guide member, said base and head being adapted to receive between them the wire cloth ends with the edges of the latter contacting said guide member, releasable means for normally locking said head to said base, a presser carried by said head and being engageable with the wire cloth edges adjacent the end of said slot, and a brazing torch carried by said head in position to apply heat to said wire cloth edges adjacent said presser.

16. A portable machine for brazing together wire cloth ends comprising a base adapted for movement beneath adjacent wire cloth ends in supporting relationship thereto, a guide member fixed to said base for engagement by the edges of the wire cloth ends, a head mounted on said base for engagement with the top surfaces of said wire cloth ends, a presser carried by said head and being engageable with said wire cloth edges and a brazing torch carried by said head in position to apply heat to said wire cloth edges adjacent said presser.

17. A machine according to claim 15 characterized by a microscope carried by said head adjacent said brazing torch for permitting magnified observation of the progress of the brazing operation.

18. A machine according to claim 15 characterized by supporting means for said brazing torch permitting movement thereof into and out of operative position.

19. A machine according to claim 15 characterized by means for supporting said brazing torch for vertical adjustment.

20. A portable machine for brazing together wire cloth ends comprising a base, a guide member fixed to said base, a head mounted on said base for slidable movement lengthwise of said guide member, said base and head being adapted to receive between them the wire cloth ends with the edges of the latter contacting said guide member, releasable means for normally locking said head to said base, a presser carried by said head and being engageable with the wire cloth edges adjacent the end of said guide member and a brazing torch carried by said head in position to apply heat to said wire cloth edges adjacent said presser.

21. A machine for brazing together wire cloth edges comprising a base adapted for movement beneath adjacent wire cloth ends in supporting relation thereto, a guide member fixed to said base for engagement by the edges of the wire cloth ends, a head mounted on said base for engagement with the top surfaces of said wire cloth ends, a presser carried by said head and being engageable with said wire cloth edges, and a gas torch carried by said head in position to apply heat to said wire cloth edges adjacent said presser.

22. A machine according to claim 15 characterized by a yoke comprising a cross-bar which supports the brazing torch and arms which straddle and are pivoted to the head, and means for adjustably supporting the cross-bar end of the yoke to vary the height of the brazing torch relative to the wire cloth.

23. The method of joining together wire cloth ends which comprises pressing the edges of said ends against a guide member carried by a base on which rests said wire cloth ends, pressing the wire cloth edges against said base by a presser contacting said edges adjacent one end of said guide member and carried by a head supported by said base and resting on said wire cloth ends, heating the wire cloth edges adjacent said presser and moving said base beneath said wire cloth ends.

24. The method according to claim 23 characterized by the method of rebrazing defects in the seam by discontinuing the heat and stopping the movement of said base, sliding the head on the base in a direction opposite to the normal direction of movement of the base, re-applying the heat and returning the head to its normal position on the base.

25. The method of brazing together the edges of woven wire cloth which includes abutting the wire cloth edges against the sides of a longitudinal guide member carried by a movable base, and pressing said edges against part of said base by presser means, and heating said edges adjacent said presser means while said edges and said base are being moved relatively to each other.

26. The method of brazing together the edges of woven wire cloth which includes abutting the wire cloth edges against the sides of a longitudinal guide member carried by a movable base interposing a seam element between said edges and in said base, and pressing said edges against part of said base by presser means, and heating said edges adjacent said presser means while said edges and said base are being moved relatively to each other.

27. The method of claim 25 characterized by applying tension to the ends of the cloth lengthwise of their edges.

28. The method according to claim 25 characterized by the method of rebrazing defects in the seam by discontinuing the heat and stopping the movement of the base, moving the heating means in a direction opposite to the normal direction of movement of the base, re-applying the heat, and moving the heating means to its normal position with respect to the base.

NELSON W. WEBB.